US012602374B2

(12) United States Patent
Chen et al.

(10) Patent No.: US 12,602,374 B2
(45) Date of Patent: Apr. 14, 2026

(54) DATA ACQUISITION METHOD AND APPARATUS, COMPUTER DEVICE AND STORAGE MEDIUM

(71) Applicant: Beijing Volcano Engine Technology Co., Ltd., Beijing (CN)

(72) Inventors: Wenjing Chen, Beijing (CN); Shuqing He, Beijing (CN); Guoxiang Zhao, Beijing (CN); Hongjian Peng, Beijing (CN); Yuan Song, Beijing (CN); Xiaowei Chen, Beijing (CN); Fangyuan Zhou, Beijing (CN); Yu Chen, Beijing (CN); Mingjun Tang, Beijing (CN); Huixiang Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/052,975

(22) Filed: Feb. 13, 2025

(65) Prior Publication Data

US 2025/0272281 A1     Aug. 28, 2025

(30) Foreign Application Priority Data

Feb. 22, 2024     (CN) .......................... 202410199435.7

(51) Int. Cl.
G06F 16/242          (2019.01)
(52) U.S. Cl.
CPC ................................. G06F 16/243 (2019.01)

(58) Field of Classification Search
CPC ..................................................... G06F 16/243
See application file for complete search history.

(56) References Cited

U.S. PATENT DOCUMENTS

| | | | |
|---|---|---|---|
| 2021/0191962 A1 | 6/2021 | Qu et al. | |
| 2023/0040095 A1 | 2/2023 | Shang et al. | |
| 2023/0244934 A1 | 8/2023 | Lazaridou et al. | |
| 2024/0338378 A1 * | 10/2024 | Setlur | G06F 16/243 |
| 2024/0370479 A1 * | 11/2024 | Hudetz | G06F 16/316 |
| 2025/0085700 A1 * | 3/2025 | Carrara | G05B 19/41885 |

FOREIGN PATENT DOCUMENTS

| | | |
|---|---|---|
| CN | 113076401 A | 7/2021 |
| CN | 116521893 A | 8/2023 |

* cited by examiner

*Primary Examiner* — Aleksandr Kerzhner
*Assistant Examiner* — Aryan D Toughiry
(74) *Attorney, Agent, or Firm* — Alleman Hall LLP

(57)          ABSTRACT

The present disclosure relates to the field of data processing technology, and discloses a data acquisition method and apparatus, a computer device and a storage medium. The method includes: acquiring question information; determining task information corresponding to the question information using a pre-trained language model, where the task information comprises a keyword in the question information and a target data source type; obtaining a search result by searching, using the pre-trained language model and according to a prompt corresponding to the task information, an associated data source in at least one candidate data source; and determining at least one data source to be provided from the at least one candidate data source according to the search result, and providing metadata of the at least one data source to be provided to the user.

20 Claims, 4 Drawing Sheets

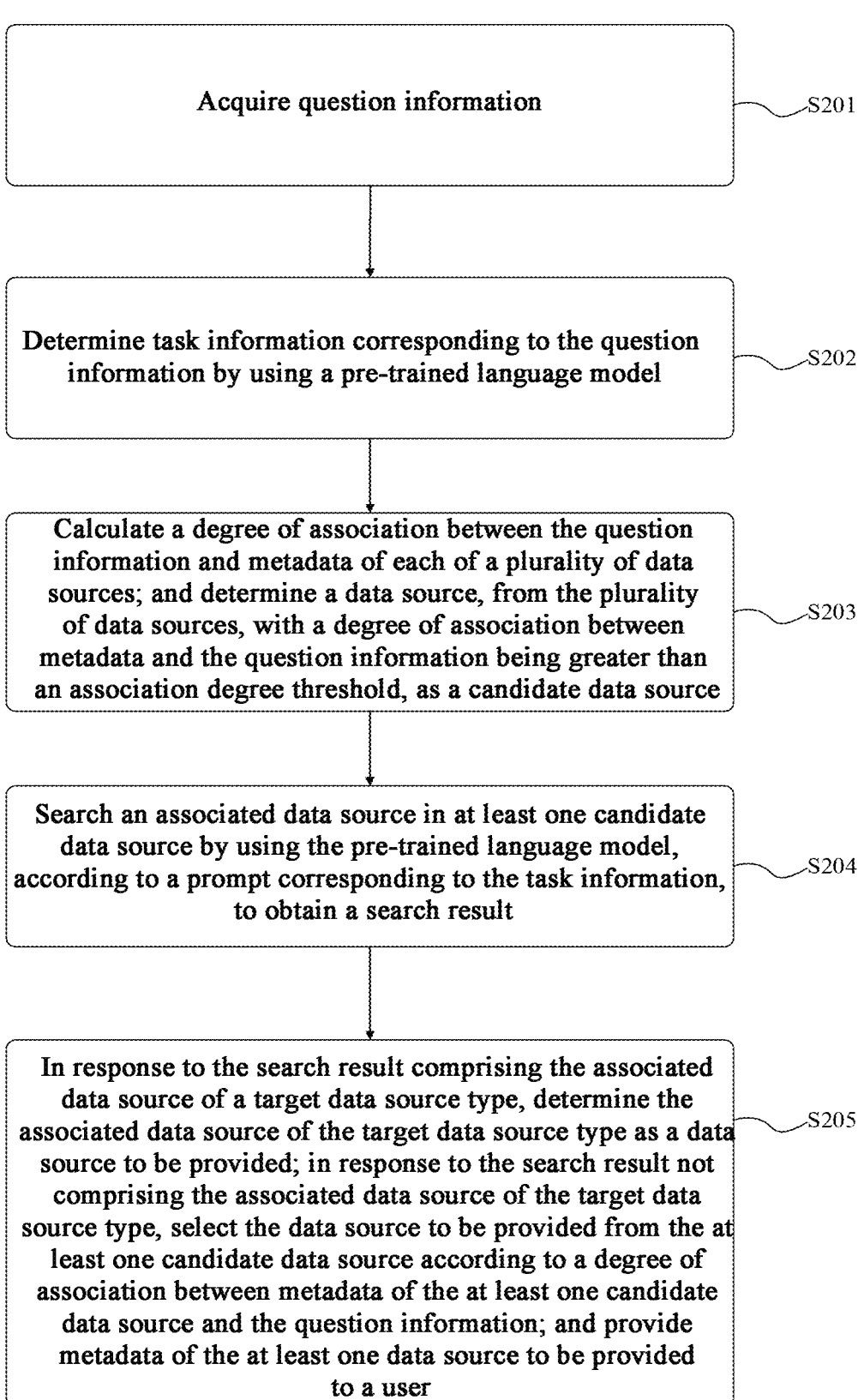

Acquire question information ⎯ S201

Determine task information corresponding to the question information by using a pre-trained language model ⎯ S202

Calculate a degree of association between the question information and metadata of each of a plurality of data sources; and determine a data source, from the plurality of data sources, with a degree of association between metadata and the question information being greater than an association degree threshold, as a candidate data source ⎯ S203

Search an associated data source in at least one candidate data source by using the pre-trained language model, according to a prompt corresponding to the task information, to obtain a search result ⎯ S204

In response to the search result comprising the associated data source of a target data source type, determine the associated data source of the target data source type as a data source to be provided; in response to the search result not comprising the associated data source of the target data source type, select the data source to be provided from the at least one candidate data source according to a degree of association between metadata of the at least one candidate data source and the question information; and provide metadata of the at least one data source to be provided to a user ⎯ S205

Fig. 2

DATA ACQUISITION METHOD AND APPARATUS, COMPUTER DEVICE AND STORAGE MEDIUM

CROSS-REFERENCE TO RELATED APPLICATION(S)

This application claims priority to Chinese Application No. 202410199435.7 filed on Feb. 22, 2024, the disclosure of which is incorporated herein by reference in its entirety.

TECHNICAL FIELD

The present disclosure relates to the field of data processing technology, and in particular, to a data acquisition method and apparatus, a computer device and a storage medium.

BACKGROUND

The data acquisition function is a basic function of a system that manages data. The current data acquisition function is to select, by a user, an acquisition condition, and acquire data from a data source according to the acquisition condition selected by the user.

SUMMARY

In a first aspect, embodiments of the present disclosure provide a data acquisition method, including:

acquiring question information, where the question information indicates a need to search an associated data source, and the associated data source is a data source related to data that a user needs;

determining task information corresponding to the question information using a pre-trained language model, where the task information comprises a keyword and a target data source type in the question information;

obtaining a search result by searching, using the pre-trained language model and according to a prompt corresponding to the task information, an associated data source in at least one candidate data source, where the prompt is used to prompt the pre-trained language model to search the associated data source according to the task information corresponding to the question information; and determining at least one data source to be provided from the at least one candidate data source according to the search result, and providing metadata of the at least one data source to be provided to the user.

In an optional implementation, determining the at least one data source to be provided from the at least one candidate data source according to the search result includes:

in response to the search result comprising an associated data source of the target data source type, determining the associated data source of the target data source type as the data source to be provided; and in response to the search result not comprising the associated data source of the target data source type, selecting the data source to be provided from the at least one candidate data source according to a degree of association between metadata of the at least one candidate data source and the question information.

In an optional implementation, the method further includes:

in response to the search result comprising the associated data source of the target data source type, generating, using the pre-trained language model and according to the prompt corresponding to the task information, summary information of the associated data source of the target data source type, where the summary information comprises introduction information indicating a feature of the associated data source of the target data source type, and usage information indicating a usage of the associated data source of the target data source type; and providing the summary information to the user.

In an optional implementation, the method further includes:

calculating a degree of association between metadata of each of a plurality of data sources and the question information; and determining a data source, from the plurality of data sources, with a degree of association between metadata and the question information being greater than an association degree threshold, as the candidate data source.

In an optional implementation, acquiring the question information includes:

obtaining the question information by rewriting, using the pre-trained language model, at least one question sentence input by the user.

In an optional implementation, the method further includes:

receiving data usage indication information, where the data usage indication information indicates performing an operation by using a field of at least one data source;

determining, using the pre-trained language model and according to the data usage indication information, at least one target data source, a target field of the at least one target data source, and a target operation for the target field of the at least one target data source; and obtaining an operation result by performing the target operation on the target field of the at least one target data source, and providing the operation result to the user.

In an optional implementation, determining, by using the pre-trained language model, the at least one target data source, the target field of the at least one target data source, and the target operation for the target field of the at least one target data source according to the data usage indication information includes:

in response to determining, using the pre-trained language model, that a data source whose name matches a sentence describing a data source in the data usage indication information exists in a plurality of data sources, determining the data source whose name matches the sentence describing the data source as a target data source corresponding to the sentence describing the data source; and in response to determining, using the pre-trained language model, that a data source whose name matches the sentence describing the data source does not exist in the plurality of data sources, generating, using the pre-trained language model, a sentence indicating a need to search a data source described by the sentence describing the data source; determining task information corresponding to the generated sentence, and searching, using the pre-trained language model and according to a prompt corresponding to the task information corresponding to the generated sentence, a target data source corresponding to the sentence describing the data source from the plurality of data sources.

In a second aspect, embodiments of the present disclosure provide a data acquisition apparatus, including:

an acquisition unit, configured to acquire question information, where the question information indicates a need to search an associated data source, and the associated data source is a data source related to data that a user needs;

a task information determination unit, configured to determine task information corresponding to the question information using a pre-trained language model, where the task information comprises a keyword and a target data source type in the question information;

a search unit, configured to obtain a search result by searching, using the pre-trained language model and according to a prompt corresponding to the task information, an associated data source in at least one candidate data source, where the prompt is used to prompt the pre-trained language model to search the associated data source according to the task information corresponding to the question information; and a data source determination unit, configured to determine at least one data source to be provided from the at least one candidate data source according to the search result, and providing metadata of the at least one data source to be provided to the user.

In an optional implementation, the data source determination unit is further configured to, in response to the search result comprising an associated data source of the target data source type, determine the associated data source of the target data source type as the data source to be provided; and in response to the search result not comprising the associated data source of the target data source type, select the data source to be provided from the at least one candidate data source according to a degree of association between metadata of the at least one candidate data source and the question information.

In an optional implementation, the data acquisition apparatus further includes:

a summary information providing unit, configured to, in response to the search result comprising the associated data source of the target data source type, generate, using the pre-trained language model and according to the prompt corresponding to the task information, summary information of the associated data source of the target data source type, where the summary information comprises introduction information indicating a feature of the associated data source of the target data source type, and usage information indicating a usage of the associated data source of the target data source type; and provide the summary information to the user.

In an optional implementation, the data acquisition apparatus further includes:

a candidate data source determination unit, configured to calculate a degree of association between metadata of each of a plurality of data sources and the question information; and determine a data source, from the plurality of data sources, with a degree of association between metadata and the question information being greater than an association degree threshold, as the candidate data source.

In an optional implementation, the obtaining unit is further configured to obtain the question information by rewriting, using the pre-trained language model, at least one question sentence input by the user.

In an optional implementation, the data acquisition apparatus further includes:

a data usage unit, configured to receive data usage indication information, where the data usage indication information indicates performing an operation by using a field of at least one data source; determine, using the pre-trained language model and according to the data usage indication information, at least one target data source, a target field of the at least one target data source, and a target operation for the target field of the at least one target data source; and obtain an operation result by performing the target operation on the target field of the at least one target data source, and providing the operation result to the user.

In an optional implementation, the data usage unit is further configured to, in response to determining, using the pre-trained language model, that a data source whose name matches a sentence describing a data source in the data usage indication information exists in a plurality of data sources, determine the data source whose name matches the sentence describing the data source as a target data source corresponding to the sentence describing the data source; and in response to determining, using the pre-trained language model, that a data source whose name matches the sentence describing the data source does not exist in the plurality of data sources, generate, using the pre-trained language model, a sentence indicating a need to search a data source described by the sentence describing the data source; determining task information corresponding to the generated sentence, and search, using the pre-trained language model and according to a prompt corresponding to the task information corresponding to the generated sentence, a target data source corresponding to the sentence describing the data source from the plurality of data sources.

In a third aspect, embodiments of the present disclosure provide a computer device, including: a memory and a processor, where the memory and the processor communicatively connected with each other, the memory stores computer instructions, and the processor executes the computer instructions, to perform the method according to the first aspect or any corresponding implementation thereof.

In a fourth aspect, embodiments of the present disclosure provide a computer-readable storage medium, where the computer-readable storage medium stores with computer instructions, and the computer instructions are configured to cause a computer to perform the method according to the first aspect or any corresponding implementation thereof.

BRIEF DESCRIPTION OF THE DRAWINGS

In order to more clearly illustrate the technical solutions in the specific implementations of the present disclosure or in the prior art, the following briefly introduces the drawings that need to be used in the description of the specific implementations or the prior art. Apparently, the drawings in the following description show some implementations of the present disclosure, and persons of ordinary skill in the art may still derive other drawings from these drawings without creative efforts.

FIG. 2 is a schematic flowchart of another data acquisition method provided by embodiments of the present disclosure;

DETAILED DESCRIPTION

In order to make objectives, technical solutions and advantages of the embodiments of the present disclosure clearer, the technical solutions of the embodiments of the present disclosure will be described hereunder clearly and comprehensively with reference to the drawings in the embodiments of the present disclosure. Apparently, the described embodiments are merely some embodiments of the present disclosure, rather than all embodiments. All other embodiments obtained by those skilled in the art based on the embodiments of the present disclosure without paying creative efforts shall fall within the protection scope of the present disclosure.

The data acquisition function is a basic function of a system that manages data. The current data acquisition function is to select, by a user, an acquisition condition, and acquire data from a data source according to the acquisition condition selected by the user. A large number of acquisition conditions need to be manually set. In addition, since there may be a case where a large number of acquisition conditions that are set are low in degree of association with data that some users expect to acquire or even not associated with the data, some acquisition conditions also need to be manually added and deleted on a regular basis. The cost of data acquisition is high. How to reduce the cost of data acquisition has become a problem that needs to be solved.

In view of this, embodiments of the present disclosure provide a data acquisition method and apparatus, a computer device and a storage medium to solve the problem of how to reduce the cost of data acquisition. In the data acquisition method provided by the embodiments of the present disclosure, question information is acquired; task information corresponding to the question information is determined by using a pre-trained language model; an associated data source is searched in at least one candidate data source by using the pre-trained language model, according to a prompt corresponding to the task information, to obtain a search result; and at least one data source to be provided is determined from the at least one candidate data source according to the search result, and metadata of the at least one data source to be provided is provided to the user. There is no need to manually set a large number of acquisition conditions, and there is no need to manually add and delete some acquisition conditions on a regular basis, thereby reducing the cost of data acquisition.

Figure 1:
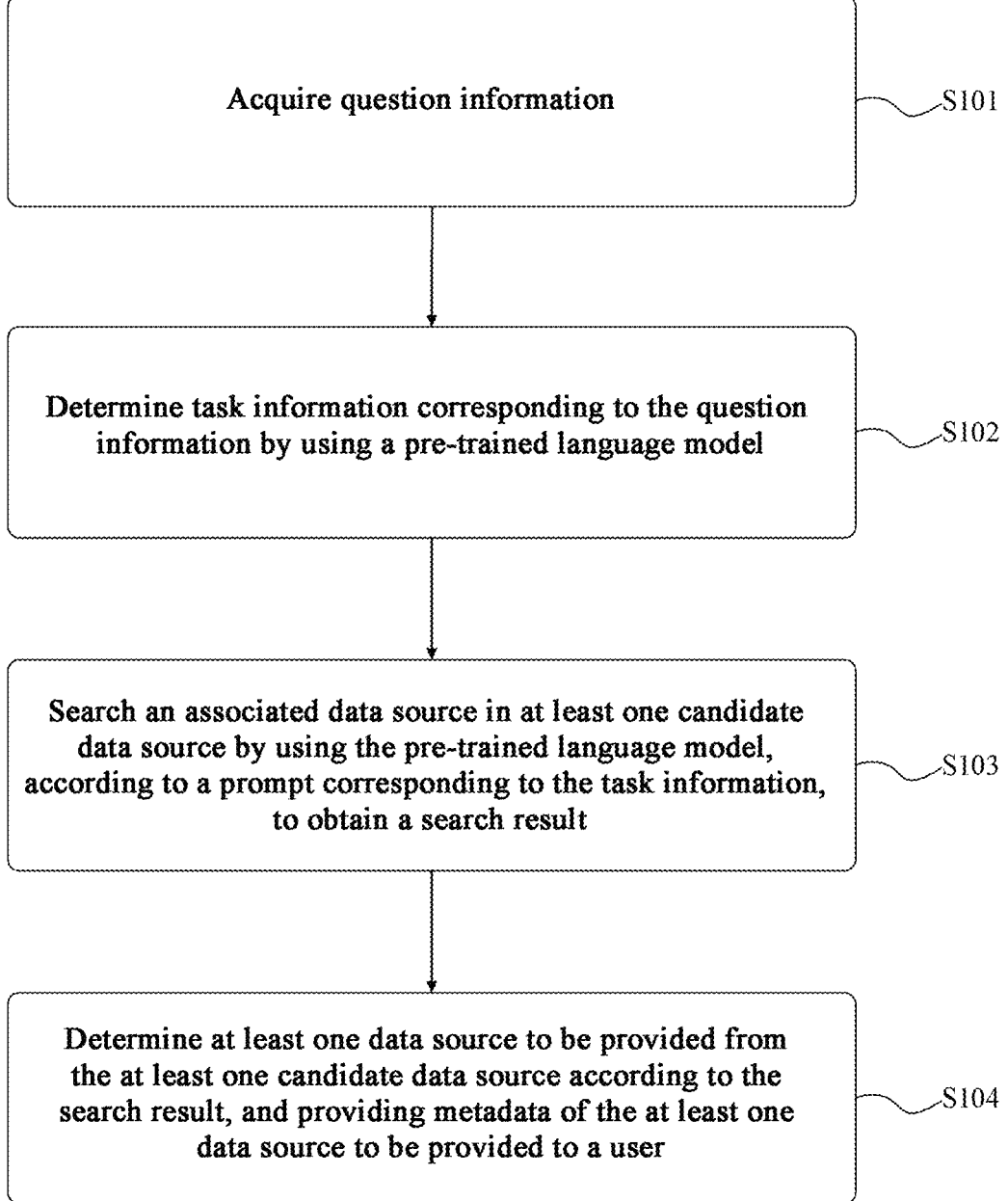
FIG. 1 is an example flowchart of a data acquisition method provided by embodiments of the present disclosure.

Referring to FIG. 1, a schematic flowchart of a data acquisition method provided by embodiments of the present disclosure is shown. The method may be executed by a computer device such as a server.

S101: acquire question information.

The question information may be a sentence in the form of a natural language input by a user. The question information indicates a need to search for an associated data source, and the associated data source is a data source related to data that the user needs.

As an example, the data that the user needs is a GMV of a merchant within 30 days, and the question information is "Which table should be used to acquire a GMV of a merchant within 30 days".

As an example, a data source may be one of data sources such as a data table, a dataset, a visual dashboard, etc. For a data table as a data source, the metadata of the data table includes a name of the data table, and each field in the data table. The dataset includes multiple data. For a dataset as a data source, the metadata of the dataset may include a name of the dataset, and a type to which a data item in a single piece of data in the dataset belongs. For a visual dashboard as a data source, the metadata of the visual dashboard may include a name of the visual dashboard, and each field in the visual dashboard.

S102: determine task information corresponding to the question information using a pre-trained language model.

The task information corresponding to the question information includes a keyword in the question information and a target data source type. The target data source type is a type of a data source that needs to be searched for.

The pre-trained language model in the embodiments of the present disclosure may specifically refer to a pre-trained language model that can be guided by a prompt to generate an output.

Semantic analysis is performed on the question information by using the pre-trained language model, and the keyword is extracted from the question information. Semantic analysis is performed on the question information by using the pre-trained language model, and the target data source type is determined.

As an example, the question information is "Which table should be used to acquire a GMV of a merchant within 30 days". GMV stands for Gross Merchandise Volume. Keywords such as "merchant", "30 days" and "GMV" are extracted from the question information by using the pre-trained language model. The target data source type is determined as the data table by using the pre-trained language model.

The task information corresponding to the question information may indicate a type of data source to be searched for to answer the question represented by the question information. For example, the question information is "Which table should be used to acquire a GMV of a merchant within 30 days", and the task information corresponding to the question information may indicate that a data table is searched for according to the indicator of a GMV of a merchant within 30 days, for the question information.

S103: obtain a search result by searching, using the pre-trained language model and according to a prompt corresponding to the task information, an associated data source in at least one candidate data source.

The prompt corresponding to the task information is used to prompt the pre-trained language model to search for the associated data source according to the task information corresponding to the question information. Specifically, the prompt corresponding to the task information is used to prompt the pre-trained language model to search for the associated data source of the target data source type according to the keyword in the question information.

The prompt corresponding to the task information may include a sentence used to prompt the pre-trained language model to find a data source that can answer the question represented by the question information.

As an example, the prompt corresponding to the task information is "You need to find, according to the following keywords, a data source of the target data source type that can answer the question {query}". The " . . . " in the prompt corresponding to the task information is the keyword in the question information, and the "query" in the prompt corresponding to the task information is the question information.

In the embodiments of the present disclosure, the candidate data source may come from a plurality of data sources stored in advance. In order to determine the candidate data source, all the keywords in the question information may be taken as one text, and the metadata of each of the plurality of data sources may be taken as one text, respectively. The degree of association between the question information and the metadata of each data source is calculated by means of calculating the degree of association between the two texts. The plurality of data sources may be sorted according to the degrees of association between their metadata and the question information in a descending order, and after sorting, each of the first preset number of data sources is determined as a candidate data source.

As an example, the manner of calculating the degree of association between the two texts is a calculation manner based on a vector space model. When calculating the degree of association between the question information and the metadata of a data source, all the keywords in the question information are represented as a vector corresponding to all the keywords in the question information, the metadata of the data source is represented as a vector corresponding to the metadata of the data source, and the similarity between the vector corresponding to all the keywords in the question information and the vector corresponding to the metadata of the data source is taken as the degree of association between the question information and the data source.

As an example, the manner of calculating the degree of association between the two texts is a manner of calculating the degree of association between two texts according to a semantic dictionary. When calculating the degree of association between the question information and the metadata of a data source, the degree of association between all the keywords in the question information, as one text, and the metadata of the data source, as one text, is calculated according to the semantic dictionary.

As an example, the manner of calculating the degree of association between the two texts is a calculation manner based on deep learning. When calculating the degree of association between the question information and the metadata of a data source, the deep neural network model for calculating the degree of association between two texts or the convolutional neural network model for calculating the degree of association between two texts is used to receive the question information and the metadata of the data source, and the deep neural network model for calculating the degree of association between two texts or the convolutional neural network model for calculating the degree of association between two texts outputs the degree of association between the question information and the metadata of the data source.

In the embodiments of the present disclosure, the data source in the search result is regarded as an associated data source. The search result may include the associated data source of the target data source type. For example, the question information is "Which table should be used to acquire a GMV of a merchant within 30 days", the associated data source of the target data source type is a data table including a GMV of a merchant within 30 days, and the search result includes the data table including a GMV of a merchant within 30 days. The search result may not include the associated data source of the target data source type.

S104: determine at least one data source to be provided from the at least one candidate data source according to the search result, and providing metadata of the at least one data source to be provided to the user.

As an example, in a case where the search result includes the associated data source of the target data source type, the associated data source of the target data source type is determined as the data source to be provided, and the metadata of the associated data source of the target data source type is provided to the user. For example, the question information is "Which table should be used to acquire a GMV of a merchant within 30 days", and the search result includes a data table including a GMV of a merchant within 30 days. The associated data source of the target data source type is the data table including a GMV of a merchant within 30 days. The data table including a GMV of a merchant within 30 days is determined as the data source to be provided, and the metadata of the data table including a GMV of a merchant within 30 days is provided to the user. After the metadata of the associated data source of the target data source type is provided to the user, the metadata of the associated data source of the target data source type may be displayed on a terminal of the user, so that the user can get knowledge of the associated data source of the target data source type. The user can perform an operation, such as a click operation, on the metadata of the associated data source of the target data source type, so as to trigger provision of data of the associated data source of the target data source type to the user. Thus, the user acquires the data of the associated data source of the target data source type. In a case where the search result does not include the associated data source of the target data source type, each of the candidate data sources may be taken as a data source to be provided, and the metadata of each candidate data source may be provided to the user. After the metadata of each candidate data source is provided to the user, the user can perform an operation, such as a click operation, on the metadata of any candidate data source, so as to trigger provision of data of the candidate data source to which the metadata being operated belongs to the user, thereby acquiring the data of the candidate data source to which the metadata being operated belongs.

Referring to FIG. 2, an example flowchart of another data acquisition method provided by embodiments of the present disclosure is shown. The method may be executed by a computer device such as a server.

S201: acquire question information.

The question information may be a sentence in the form of a natural language input by a user. The question information indicates a need to search for an associated data source, and the associated data source is a data source related to data that the user needs.

The question information may also be obtained by using a pre-trained language model to rewrite at least one question sentence in the form of a natural language input by the user. If multiple question sentences in the form of a natural language input by the user are rewritten, the multiple question sentences in the form of a natural language may be multiple consecutive question sentences in the form of a natural language input by the user. As an example, the two consecutive sentences in the form of a natural language input by the user are "Which table should be used to acquire a GMV of a merchant within 30 days" and "What about at a store level", and the two sentences input by the user consecutively are rewritten as "Which table should be used to acquire a GMV at a store level within 30 days" by using the pre-trained language model.

As an example, a data source may be one of data sources such as a data table, a dataset, a visual dashboard, etc. For a data table as a data source, the metadata of the data table includes a name of the data table, and each field in the data table. The dataset includes a plurality of data items. For a dataset as a data source, the metadata of the dataset may include a name of the dataset, and a type to which a data item in a single piece of data in the dataset belongs. For a visual dashboard as a data source, the metadata of the visual dashboard may include a name of the visual dashboard, and each field in the visual dashboard.

S202: determine task information corresponding to the question information by using a pre-trained language model.

The task information corresponding to the question information includes a keyword in the question information and a target data source type. The target data source type is a type of a data source that needs to be searched for. Semantic analysis is performed on the question information by using the pre-trained language model, and the keyword is extracted from the question information, and the target data source type is determined.

S203: calculate a degree of association between the question information and metadata of each of a plurality of data sources; and determining a data source, from the plurality of data sources, with a degree of association between metadata and the question information being greater than an association degree threshold, as a candidate data source.

The plurality of data sources may be stored in advance. For a data source i among the plurality of data sources, reference is made to any manner of calculating the degree of association between the metadata of a data source and the question information as described in the above S103 for the degree of association between the metadata of the data source i and the question information. The data source i may be any one of the plurality of data sources.

A data source, from the plurality of data sources, whose degree of association between its metadata and the question information is greater than an association degree threshold is determined as the candidate data source. Thus, when the associated data source is searched for by using the pre-trained language model, the associated data source is searched for from a data source with a high degree of association between its metadata and the question information, and the metadata provided to the user is the metadata of the data source with a high degree of association between its metadata and the question information, thereby improving the accuracy of the metadata provided to the user.

In S204, search an associated data source in at least one candidate data source by using the pre-trained language model, according to a prompt corresponding to the task information, to obtain a search result.

The prompt corresponding to the task information is used to prompt the pre-trained language model to search for the associated data source according to the task information corresponding to the question information. Specifically, the prompt corresponding to the task information is used to prompt the pre-trained language model to search for the associated data source of the target data source type according to the keyword in the question information.

The prompt corresponding to the task information may include a sentence used to prompt the pre-trained language model to find a data source that can answer the question represented by the question information.

In S205, in response to the search result comprising the associated data source of a target data source type, determine the associated data source of the target data source type as a data source to be provided; in response to the search result not comprising the associated data source of the target data source type, select the data source to be provided from the at least one candidate data source according to a degree of association between metadata of the at least one candidate data source and the question information; and provide metadata of the at least one data source to be provided to a user.

The associated data source of the target data source type is a data source of the target data source type that can answer the question represented by the question information.

In the case where the search result includes the associated data source of the target data source type, the metadata of the associated data source of the target data source type is provided to the user.

When the data source to be provided is selected from the at least one candidate data source according to the degree of association between the metadata of the candidate data source and the question information, the at least one candidate data source may be sorted according to the degrees of association between their metadata and the question information in a descending order, and after sorting, each of the first preset number of candidate data sources is selected as a data source to be provided, and the metadata of each of the first preset number of candidate data sources is provided to the user.

In the case where the search result includes the associated data source of the target data source type, the summary information of the associated data source of the target data source type may be generated by using the pre-trained language model, according to the prompt corresponding to the task information, where the summary information of the associated data source of the target data source type includes introduction information indicating the feature of the associated data source of the target data source type, and usage information indicating the usage of the associated data source of the target data source type; and the summary information of the associated data source of the target data source type is provided to the user.

The feature indicating the associated data source of the target data source type may include a field in the associated data source of the target data source type, information indicating how the associated data source of the target data source type is generated, and so on.

As an example, the prompt corresponding to the task information includes "You need to find, according to the following keywords, a data source of the target data source type that can answer the question {query}". The " . . . " in the prompt corresponding to the task information is the keyword in the question information, and the "query" in the prompt corresponding to the task information is the question information. The prompt corresponding to the task information further includes: "If you find a data source of the target data source type that can answer the question {query}, write an introduction for the data source of the target data source type that can answer the question {query} to briefly introduce the data source of the target data source type that can answer the question {query}, and explain a usage of the data source of the target data source type that can answer the question {query}".

As an example, the question information is "Which table should be used to acquire a GMV of a merchant within 30 days", and the search result includes a data table including a GMV of a merchant within 30 days. The summary information of the data table including a GMV of a merchant within 30 days is generated by using the pre-trained language model. The summary information of the data table including a GMV of a merchant within 30 days includes introduction information of the data table including a GMV of a merchant within 30 days, and usage information of the data table including a GMV of a merchant within 30 days. The summary information of the data table including a GMV of a merchant within 30 days is provided to the user.

In the case where the search result includes the associated data source of the target data source type, the summary information of the associated data source of the target data source type is generated by using the pre-trained language model, and the summary information of the associated data source of the target data source type is provided to the user. Thus, the user can not only get knowledge that the associated data source of the target data source type includes the data that the user needs, but also get knowledge of the feature of the associated data source of the target data source type through the introduction information, and get knowledge of the usage of the associated data source of the target data source type through the usage information, so that the user can acquire richer information, and the user experience is improved.

In a possible implementation, the method further includes: receiving data usage indication information, where the data usage indication information indicates using a field of at least one data source to perform an operation; determining, by using the pre-trained language model, at least one target data source, a target field of the at least one target data source, and a target operation for the target field of the at least one target data source, according to the data usage indication information; and performing the target operation on the target field of the at least one target data source, to obtain an operation result, and providing the operation result to the user.

The data usage indication information is received, the target operation is performed on the target field of the at least one target data source to obtain the operation result, and the operation result is provided to the user. Thus, the user can input the data usage indication information indicating a need to use the target field of the target data source to perform the target operation, and the target operation is automatically performed on the target field of the target data source to obtain the operation result, and the operation result is provided to the user, thereby improving the convenience of the user in using data in the data source.

In the embodiments of the present disclosure, for a data source and a field in the data source, if the data usage indication information uses the field of the data source to perform an operation, the data source is taken as the target data source, the field is taken as the target field, and the operation is taken as the target operation.

The data usage indication information may be a sentence in the form of a natural language input by the user. The semantic analysis is performed on the data usage indication information by using the pre-trained language model, and the at least one target data source, the at least one target field of the at least one target data source, and the target operation for the at least one target field of the at least one target data source are determined. As an example, the target data source is determined by using the pre-trained language model, according to a sentence describing the data source in the data usage indication information. The target field of the target data source is determined by using the pre-trained language model, according to a sentence describing the field in the data usage indication information. The target operation is determined by using the pre-trained language model, according to a sentence describing the operation in the data usage indication information.

As an example, the data usage indication information is "Use the C field of Table A to join the D field of Table B", and the two target data sources, i.e., Table A and Table B, are determined by using the pre-trained language model, the two target fields, i.e., the C field of Table A and the D field of Table B, are determined, The target operation "join" is determined, and "join" specifically refers to the join query operation of the database.

In a possible implementation, determining, by using the pre-trained language model, the at least one target data source, the target field of the at least one target data source, and the target operation for the target field of the at least one target data source, according to the data usage indication information includes: in response to determining, using the pre-trained language model, that a data source whose name matches a sentence describing a data source in the data usage indication information exists in a plurality of data sources, determining the data source whose name matches the sentence describing the data source as a target data source corresponding to the sentence describing the data source; and in response to determining, using the pre-trained language model, that a data source whose name matches the sentence describing the data source does not exist in the plurality of data sources, generating, using the pre-trained language model, a sentence indicating a need to search a data source described by the sentence describing the data source; determining task information corresponding to the generated sentence, and searching, using the pre-trained language model and according to a prompt corresponding to the task information corresponding to the generated sentence, a target data source corresponding to the sentence describing the data source from the plurality of data sources.

The plurality of data sources may be stored in advance. The process of searching, by using the pre-trained language model, for the target data source corresponding to the sentence describing the data source from the plurality of data sources is the same as the process of searching for the associated data source as described in S201 to S204. The sentence indicating the need to search for the data source described by the sentence describing the data source is equivalent to the above question information, and the task information corresponding to the generated sentence is equivalent to the task information corresponding to the above question information. Reference is made to the process of searching for the associated data source as described in S201 to S204 for the process of searching, by using the pre-trained language model, for the target data source corresponding to the sentence describing the data source from the plurality of data sources.

As an example, the data usage indication information is "Use the C field of Table A to join the GMV field in the table of the GMV of the merchant within 30 days". Both "Table A" and "the table of the GMV of the merchant within 30 days" are sentences describing data sources. It is determined, by using the pre-trained language model, that the sentence "Table A" describing the data source in the data usage indication information matches the name of Table A, and Table A is determined as the target data source corresponding to the sentence "Table A" describing the data source. It is determined, by using the pre-trained language model, that there is no data source, among the plurality of data sources, whose name matches "the table of the GMV of the merchant within 30 days", and the data source described by "the table of the GMV of the merchant within 30 days" is the data table including the GMV of the merchant within 30 days. The sentence "Which table should be used to acquire the GMV of the merchant within 30 days" indicating the need to search for the data source described by the sentence describing the data source is generated, the task information corresponding to "Which table should be used to acquire the GMV of the merchant within 30 days" is determined, and the target data source corresponding to "the table of the GMV of the merchant within 30 days", that is, the data table including the GMV of the merchant within 30 days, is searched for from the plurality of data sources, by using the pre-trained language model, according to the prompt corresponding to the task information corresponding to "Which table should be used to acquire the GMV of the merchant within 30 days".

Figure 3:
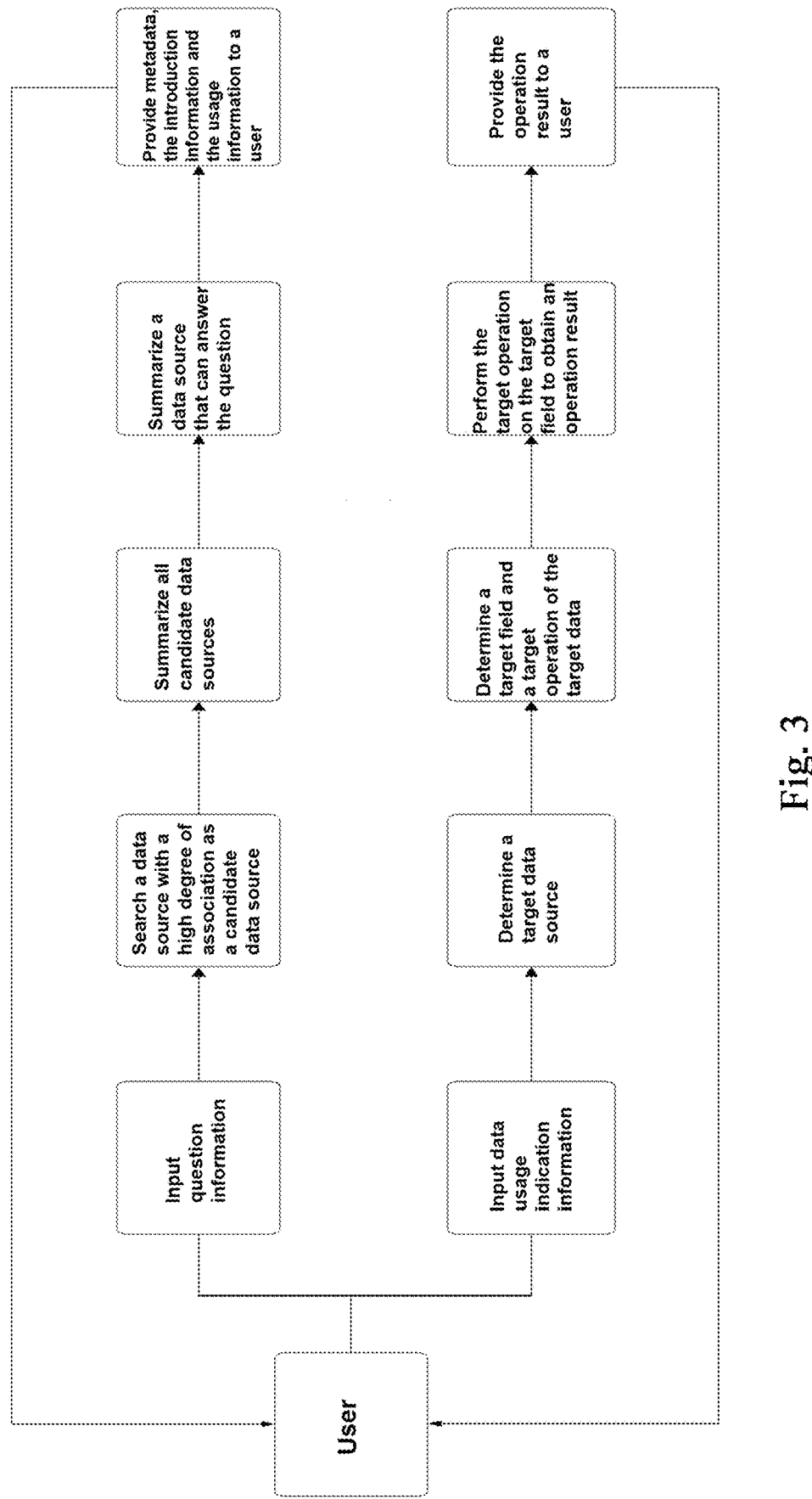
FIG. 3 is a flowchart of an example of acquiring metadata of a data source and using data of the data source.

Referring to FIG. 3, a flowchart of an example of acquiring metadata of a data source and using data of the data source is shown.

When the user inputs the question information in the form of a natural language, the data source whose degree of association between its metadata and the question information is greater than the association degree threshold is searched for from the plurality of data sources and taken as the candidate data source. The summarization for all candidate data sources includes S204 to S205. The summarization is performed for all candidate data sources, to summarize the data source that can answer the question represented by the question information, the introduction information of the data source, and the usage information of the data source. The data source that can answer the question represented by the question information refers to the associated data source of the target data source type that is searched for from all the candidate data sources by using the pre-trained language model. The metadata of the data source that can answer the question represented by the question information, the introduction information of the data source, and the usage information of the data source are provided, so that the user can get knowledge that the associated data source of the target data source type includes the data that the user needs, the feature of the associated data source of the target data source type, and the usage of the associated data source of the target data source type. When the user inputs the data usage indication information in the form of a natural language, the target data source, the target field of the target data source, and the target operation are determined, the target operation is performed on the target field of all the target data sources to obtain the operation result. The operation result is provided to the user. The target operation is automatically performed on the target field of the target data source to obtain the operation result, and the operation result is provided to the user, thereby improving the convenience of the user in using the data in the data source.

The present embodiments provide a data acquisition apparatus, and the apparatus is used to implement the above embodiments and preferred implementations, which will not be repeated. As used below, the term "unit" may be a combination of software and/or hardware that implements a predetermined function. Although the apparatus described in the following embodiments is preferably implemented in software, the implementation of hardware, or a combination of software and hardware, is also possible and contemplated.

The data acquisition apparatus provided by the embodiments of the present disclosure includes:

an acquisition unit, configured to acquire question information, where the question information indicates a need to search an associated data source, and the associated data source is a data source related to data that a user needs;

a task information determination unit, configured to determine task information corresponding to the question information using a pre-trained language model, where the task information comprises a keyword in the question information and a target data source type;

a search unit, configured to obtain a search result by searching, using the pre-trained language model and according to a prompt corresponding to the task information, an associated data source in at least one candidate data source, where the prompt is used to prompt the pre-trained language model to search the associated data source according to the task information corresponding to the question information; and a data source determination unit, configured to determine at least one data source to be provided from the at least one candidate data source according to the search result, and providing metadata of the at least one data source to be provided to the user.

In an optional implementation, the data source determination unit is further configured to: in response to the search result comprising an associated data source of the target data source type, determine the associated data source of the target data source type as the data source to be provided; and in response to the search result not comprising the associated data source of the target data source type, select the data source to be provided from the at least one candidate data source according to a degree of association between metadata of the at least one candidate data source and the question information.

In an optional implementation, the data acquisition apparatus further includes:

a summary information providing unit, configured to: in response to the search result comprising the associated data source of the target data source type, generate, using the pre-trained language model and according to the prompt corresponding to the task information, summary information of the associated data source of the target data source type, where the summary information comprises introduction information indicating a feature of the associated data source of the target data source type, and usage information indicating a usage of the associated data source of the target data source type; and provide the summary information to the user.

In an optional implementation, the data acquisition apparatus further includes:

a candidate data source determination unit, configured to calculate a degree of association between metadata of each of a plurality of data sources and the question information; and determine a data source, from the plurality of data sources, with a degree of association between metadata and the question information being greater than an association degree threshold, as the candidate data source.

In an optional implementation, the obtaining unit is further configured to obtain the question information by rewriting, using the pre-trained language model, at least one question sentence input by the user.

In an optional implementation, the data acquisition apparatus further includes:

a data usage unit, configured to receive data usage indication information, where the data usage indication information indicates performing an operation by using a field of at least one data source; determine, using the pre-trained language model and according to the data usage indication information, at least one target data source, a target field of the at least one target data source, and a target operation for the target field of the at least one target data source; and obtain an operation result by performing the target operation on the target field of the at least one target data source, and providing the operation result to the user.

In an optional implementation, the data usage unit is further configured to: in response to determining, using the pre-trained language model, that a data source whose name matches a sentence describing a data source in the data usage indication information exists in a plurality of data sources, determine the data source whose name matches the sentence describing the data source as a target data source corresponding to the sentence describing the data source; and in response to determining, using the pre-trained language model, that a data source whose name matches the sentence describing the data source does not exist in the plurality of data sources, generate, using the pre-trained language model, a sentence indicating a need to search a data source described by the sentence describing the data source; determine task information corresponding to the generated sentence, and search, using the pre-trained language model and according to a prompt corresponding to the task information corresponding to the generated sentence, a target data source corresponding to the sentence describing the data source from the plurality of data sources.

In the embodiments of the present disclosure, the apparatus is presented in the form of functional units, and the units here refer to an ASIC circuit, a processor and a memory that execute one or more pieces of software or a fixed program, and/or other devices that can provide the above functions.

For further functional descriptions of the above units, reference may be made to the above corresponding embodiments, which will not be repeated here.

Figure 4:
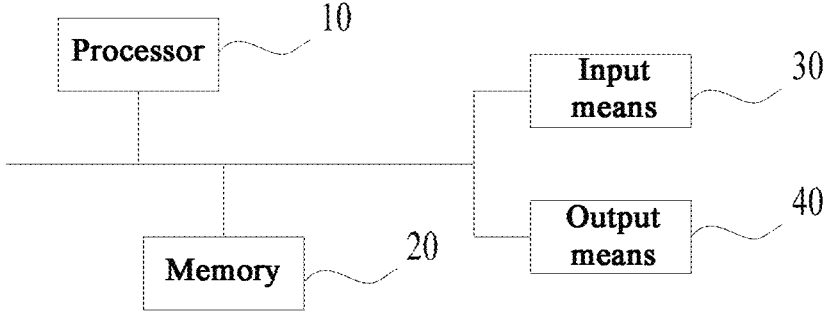
FIG. 4 is a schematic diagram of a hardware structure of a computer device provided by embodiments of the present disclosure.

Referring to FIG. 4, a schematic diagram of a hardware structure of a computer device provided by embodiments of the present disclosure is shown. The computer device has the above apparatus, and the computer device includes: one or more processors 10, a memory 20, and interfaces for connecting components, including high-speed interfaces and low-speed interfaces. The components communicate with each other by means of different buses, and can be installed on a common motherboard or installed in other manners as required. The processor may process instructions executed within the computer device, including instructions stored in the memory or on the memory to display graphical information of a GUI on an external input/output means (such as, a display apparatus coupled to the interface). In some optional implementations, multiple processors and/or multiple buses may be used, along with multiple memories and multiple memories, if required. Likewise, multiple computer devices may be connected, with each device providing some necessary operations (e.g., as a server array, a set of blade servers, or a multi-processor system).

The processor 10 may be a central processing unit, a network processor, or a combination thereof. The processor 10 may further include a hardware chip. The hardware chip may be an application specific integrated circuit, a programmable logic device, or a combination thereof. The programmable logic device may be a complex programmable logic device, a field programmable logic gate array, a generic array logic, or any combination thereof.

The memory 20 stores instructions executable by at least one processor 10, to enable the at least one processor 10 to perform the method illustrated in the above embodiments.

The memory 20 may include a program storage area and a data storage area, where the program storage area may store an operating system and an application required by at least one function; and the data storage area may store data created according to the use of the computer device. In addition, the memory 20 may include a high-speed random access memory, and may further include a non-transitory memory, such as at least one disk storage device, a flash memory device, or other non-transitory solid-state storage devices. In some optional implementations, the memory 20 may optionally include a memory provided remotely from the processor 10, and these remote memories may be connected to the computer device via a network. Examples of the network include, but are not limited to, the Internet, an intranet, a local area network, a mobile communication network, and a combination thereof.

The memory 20 may include a volatile memory, for example, a random access memory. The memory may also include a non-volatile memory, for example, a flash memory, a hard disk, or a solid-state disk. The memory 20 may further include a combination of the above-mentioned types of memories.

The computer device further includes an input means 30 and an output means 40. The processor 10, the memory 20, the input means 30 and the output means 40 may be connected by means of a bus or in other manners.

The input means 30 may receive input digital or character information, and generate key signal input related to user settings and function control of the computer device, such as a touch screen, a keypad, a mouse, a trackpad, a touchpad, an indicator bar, one or more mouse buttons, a trackball, a joystick, and the like. The output means 40 may include a display apparatus, an auxiliary lighting apparatus (for example, an LED), a tactile feedback apparatus (for example, a vibration motor), and the like. The above-mentioned display apparatus includes but is not limited to a liquid crystal display, a light emitting diode, a display, and a plasma display. In some optional implementations, the display apparatus may be a touch screen.

The embodiments of the present disclosure further provide a computer-readable storage medium. The method according to the embodiments of the present disclosure may be implemented in hardware, firmware, or computer code that may be recorded on a storage medium, or computer code that is originally stored in a remote storage medium or a non-transitory machine-readable storage medium and downloaded via a network and will be stored in a local storage medium, so that the method described herein may be stored on such software processing on a storage medium using a general computer, a dedicated processor, or programmable or dedicated hardware. The storage medium may be a magnetic disk, an optical disk, a read-only memory, a random-access memory, a flash memory, a hard disk, a solid-state disk, or the like. Furthermore, the storage medium may further include a combination of the above-mentioned types of memories. It may be understood that a computer, a processor, a microprocessor controller, or programmable hardware includes a storage component that can store or receive software or computer code, and when the software or computer code is accessed and executed by the computer, the processor, or the hardware, the method illustrated in the above embodiments is implemented.

Although the embodiments of the present disclosure are described in conjunction with the drawings, those skilled in the art can make various modifications and variations without departing from the spirit and scope of the present disclosure, and such modifications and variations all fall within the scope defined by the appended claims.

The invention claimed is:

1. A data acquisition method, comprising:

acquiring question information, wherein the question information indicates a need to search an associated data source, and the associated data source is a data source related to data that a user needs;

determining task information corresponding to the question information using a pre-trained language model, wherein the task information comprises a keyword in the question information and a target data source type;

obtaining a search result by searching, using the pre-trained language model and according to a prompt corresponding to the task information, an associated data source in at least one candidate data source, wherein the prompt is used to prompt the pre-trained language model to search the associated data source according to the task information corresponding to the question information;

determining at least one data source to be provided from the at least one candidate data source according to the search result;

transmitting metadata of the at least one data source to be provided to a user terminal to cause the user terminal to display the metadata;

receiving data usage indication information, wherein the data usage indication information indicates performing an operation by using a field of at least one data source; and determining, using the pre-trained language model and according to the data usage indication information, at least one target data source, a target field of the at least one target data source, and a target operation for the target field of the at least one target data source;

wherein determining, using the pre-trained language model and according to the data usage indication information, the at least one target data source, the target field of the at least one target data source, and the target operation for the target field of the at least one target data source comprises:

in response to determining, using the pre-trained language model, that a data source whose name matches a sentence describing a data source in the data usage indication information exists in a plurality of data sources, determining the data source whose name matches the sentence describing the data source as a target data source corresponding to the sentence describing the data source.

2. The method according to claim 1, wherein determining the at least one data source to be provided from the at least one candidate data source according to the search result comprises:

in response to the search result comprising an associated data source of the target data source type, determining the associated data source of the target data source type as the data source to be provided; and in response to the search result not comprising the associated data source of the target data source type, selecting the data source to be provided from the at least one candidate data source according to a degree of association between metadata of the at least one candidate data source and the question information.

3. The method according to claim 1, wherein the method further comprises:

in response to the search result comprising the associated data source of the target data source type, generating, using the pre-trained language model and according to the prompt corresponding to the task information, summary information of the associated data source of the target data source type, wherein the summary information comprises introduction information indicating a feature of the associated data source of the target data source type, and usage information indicating a usage of the associated data source of the target data source type; and providing the summary information to the user.

4. The method according to claim 1, wherein the method further comprises:

calculating a degree of association between metadata of each of a plurality of data sources and the question information; and determining a data source, from the plurality of data sources, with a degree of association between metadata and the question information being greater than an association degree threshold, as the candidate data source.

5. The method according to claim 1, wherein acquiring the question information comprises:

obtaining the question information by rewriting, using the pre-trained language model, at least one question sentence input by the user.

6. The method according to claim 1, wherein the method further comprises:

obtaining an operation result by performing the target operation on the target field of the at least one target data source, and providing the operation result to the user.

7. The method according to claim 6, wherein determining, using the pre-trained language model and according to the data usage indication information, the at least one target data source, the target field of the at least one target data source, and the target operation for the target field of the at least one target data source comprises:

in response to determining, using the pre-trained language model, that the data source whose name matches the sentence describing the data source does not exist in the plurality of data sources, generating, using the pre-trained language model, a sentence indicating a need to search a data source described by the sentence describing the data source; determining task information corresponding to the generated sentence, and searching, using the pre-trained language model and according to a prompt corresponding to the task information corresponding to the generated sentence, a target data source corresponding to the sentence describing the data source from the plurality of data sources.

8. A computer device, comprising:

a memory and a processor, the memory and the processor communicatively connected with each other, the memory storing computer instructions, and the computer instructions, when executed by the processor, causing the computer device to:

acquire question information, wherein the question information indicates a need to search an associated data source, and the associated data source is a data source related to data that a user needs;

determine task information corresponding to the question information using a pre-trained language model, wherein the task information comprises a keyword in the question information and a target data source type;

obtain a search result by searching, using the pre-trained language model and according to a prompt corresponding to the task information, an associated data source in at least one candidate data source, wherein the prompt is used to prompt the pre-trained language model to search the associated data source according to the task information corresponding to the question information;

determine at least one data source to be provided from the at least one candidate data source according to the search result;

transmit metadata of the at least one data source to be provided to a user terminal to cause the user terminal to display the metadata;

receive data usage indication information, wherein the data usage indication information indicates performing an operation by using a field of at least one data source; and determine, using the pre-trained language model and according to the data usage indication information, at least one target data source, a target field of the at least one target data source, and a target operation for the target field of the at least one target data source;

wherein the computer instructions causing the computer device to determine, using the pre-trained language model and according to the data usage indication information, the at least one target data source, the target field of the at least one target data source, and the target operation for the target field of the at least one target data source further cause the computer device to:

in response to determining, using the pre-trained language model, that a data source whose name matches a sentence describing a data source in the data usage indication information exists in a plurality of data sources, determine the data source whose name matches the sentence describing the data source as a target data source corresponding to the sentence describing the data source.

9. The computer device according to claim 8, wherein the computer instructions causing the computer device to determine the at least one data source to be provided from the at least one candidate data source according to the search result further cause the computer device to:

in response to the search result comprising an associated data source of the target data source type, determine the associated data source of the target data source type as the data source to be provided; and in response to the search result not comprising the associated data source of the target data source type, select the data source to be provided from the at least one candidate data source according to a degree of association between metadata of the at least one candidate data source and the question information.

10. The computer device according to claim 8, wherein the computer instructions further cause the computer device to:

in response to the search result comprising the associated data source of the target data source type, generate, using the pre-trained language model and according to the prompt corresponding to the task information, summary information of the associated data source of the target data source type, wherein the summary information comprises introduction information indicating a feature of the associated data source of the target data source type, and usage information indicating a usage of the associated data source of the target data source type; and provide the summary information to the user.

11. The computer device according to claim 8, wherein the computer instructions further cause the computer device to:

calculate a degree of association between metadata of each of a plurality of data sources and the question information; and determine a data source, from the plurality of data sources, with a degree of association between metadata and the question information being greater than an association degree threshold, as the candidate data source.

12. The computer device according to claim 8, wherein the computer instructions causing the computer device to acquire the question information further cause the computer device to:

obtain the question information by rewriting, using the pre-trained language model, at least one question sentence input by the user.

13. The computer device according to claim 8, wherein the computer instructions further cause the computer device to:

obtain an operation result by performing the target operation on the target field of the at least one target data source, and providing the operation result to the user.

14. The computer device according to claim 13, wherein the computer instructions causing the computer device to determine, using the pre-trained language model and according to the data usage indication information, the at least one target data source, the target field of the at least one target data source, and the target operation for the target field of the at least one target data source further cause the computer device to:

in response to determining, using the pre-trained language model, that the data source whose name matches the sentence describing the data source does not exist in the plurality of data sources, generate, using the pre-trained language model, a sentence indicating a need to search a data source described by the sentence describing the data source; determine task information corresponding to the generated sentence, and search, using the pre-trained language model and according to a prompt corresponding to the task information corresponding to the generated sentence, a target data source corresponding to the sentence describing the data source from the plurality of data sources.

15. A non-transitory computer-readable storage medium, wherein the computer-readable storage medium stores computer instructions, and the computer instructions are configured to cause a computer to:

acquire question information, wherein the question information indicates a need to search an associated data source, and the associated data source is a data source related to data that a user needs;

determine task information corresponding to the question information using a pre-trained language model, wherein the task information comprises a keyword in the question information and a target data source type;

obtain a search result by searching, using the pre-trained language model and according to a prompt corresponding to the task information, an associated data source in at least one candidate data source, wherein the prompt is used to prompt the pre-trained language model to search the associated data source according to the task information corresponding to the question information;

determine at least one data source to be provided from the at least one candidate data source according to the search result;

transmit metadata of the at least one data source to be provided to a user terminal to cause the user terminal to display the metadata;

receive data usage indication information, wherein the data usage indication information indicates performing an operation by using a field of at least one data source; and determine, using the pre-trained language model and according to the data usage indication information, at least one target data source, a target field of the at least one target data source, and a target operation for the target field of the at least one target data source;

wherein the computer instructions causing the computer to determine, using the pre-trained language model and according to the data usage indication information, the at least one target data source, the target field of the at least one target data source, and the target operation for the target field of the at least one target data source further cause the computer to:

in response to determining, using the pre-trained language model, that a data source whose name matches a sentence describing a data source in the data usage indication information exists in a plurality of data sources, determine the data source whose name matches the sentence describing the data source as a target data source corresponding to the sentence describing the data source.

16. The medium according to claim 15, wherein the computer instructions causing the computer to determine the at least one data source to be provided from the at least one candidate data source according to the search result further cause the computer to:

in response to the search result comprising an associated data source of the target data source type, determine the associated data source of the target data source type as the data source to be provided; and in response to the search result not comprising the associated data source of the target data source type, select the data source to be provided from the at least one candidate data source according to a degree of association between metadata of the at least one candidate data source and the question information.

17. The medium according to claim 15, wherein the computer instructions further cause the computer to:

in response to the search result comprising the associated data source of the target data source type, generate, using the pre-trained language model and according to the prompt corresponding to the task information, summary information of the associated data source of the target data source type, wherein the summary information comprises introduction information indicating a feature of the associated data source of the target data source type, and usage information indicating a usage of the associated data source of the target data source type; and provide the summary information to the user.

18. The medium according to claim 15, wherein the computer instructions further cause the computer to:

calculate a degree of association between metadata of each of a plurality of data sources and the question information; and determine a data source, from the plurality of data sources, with a degree of association between metadata and the question information being greater than an association degree threshold, as the candidate data source.

19. The medium according to claim 15, wherein the computer instructions causing the computer to acquire the question information further cause the computer to:

obtain the question information by rewriting, using the pre-trained language model, at least one question sentence input by the user.

20. The medium according to claim 15, wherein the computer instructions further cause the computer to:

obtain an operation result by performing the target operation on the target field of the at least one target data source, and providing the operation result to the user.

* * * * *